United States Patent Office 3,775,439
Patented Nov. 27, 1973

3,775,439
PROCESS FOR THE EPOXIDATION OF HEXAFLUOROPROPYLENE
George Milton Atkins, Jr., Wilmington, Del., assignor to E. I. du Pont de Nemours and Company, Wilmington, Del.
No Drawing. Filed May 31, 1972, Ser. No. 258,363
Int. Cl. C07d 1/06
U.S. Cl. 260—348.5 R       7 Claims

ABSTRACT OF THE DISCLOSURE

In a process for the epoxidation of hexafluoropropylene which comprises (a) activating silica gel by contacting it with a member selected from the class consisting of a mixture of oxygen and hexafluoropropylene, hexafluoropropylene epoxide and mixtures thereof at from 175 to 400° C. and (b) contacting the activated silica gel with hexafluoropropylene and oxygen at from 140 to 280° C., the improvement which comprises (1) contacting the silica gel with hydrochloric acid, and
(2) thereafter water washing the silica gel prior to step (a).

---

This invention relates to the epoxidation of hexafluoropropylene. Particularly, this invention relates to accomplishing the aforesaid epoxidation through the use of silica gel and oxygen. More particularly, this invention relates to pretreating the silica gel with hydrochloric acid.

It was known that hexafluoropropylene epoxide could be prepared by contacting hexafluoropropylene and oxygen with activated silica gel. An improved process was sought.

Such a process has been found. It is an improvement in a process for the epoxidation of hexafluoropropylene which comprises (a) activating silica gel by contacting it with a member selected from the class consisting of a mixture of oxygen and hexafluoropropylene, hexafluoropropylene epoxide and mixtures thereof at from 175 to 400° C. and (b) contacting the activated silica gel with hexafluoropropylene and oxygen at from 140 to 280° C., preferably 190° to 225° C. The improvement comprises (1) contacting the silica gel with hydrochloric acid, and
(2) thereafter water washing the silica gel prior to step (a).

The beneficial effect of the treatment of the silica gel with hydrochloric acid prior to activation step (a) varies depending on the type of silica gel utilized. If the silica gel is not exceedingly active without such treatment, the use of the treatment with the hydrochloric acid produces significant improvements in conversions. If the silica gel is very active without the treatment with hydrochloric acid, the benefit is less significant.

The hydrochloric acid is normally dilute, i.e., from 0.1 to 5 normal, 0.5 to 2 normal being preferred. The contacting of the silica gel with hydrochloric acid is followed by water washing of the silica gel. Normally, such washing is continued until the wash water obtained from such washing is neutral. The washing is usually followed by drying of the silica gel. Normally, the drying temperature is not more than 400° C., generally, it is less than 200° C.

The silica gel is normally at least 98 percent by weight silica. Its surface area is generally at least 80 meter$^2$/gram, preferably at least 200 meter$^2$/gram.

The silica gel is normally activated after the hydrochloric acid treatment by contacting it with oxygen and hexafluoropropylene and/or hexafluoropropylene epoxide at from 175 to 400° C., preferably from 200 to 280° C. Activation is defined as improving the silica gel's capability of catalyzing the conversion of hexafluoropropylene and oxygen to hexafluoropropylene epoxide. The activation temperature and times are dependent on one another, the type of silica gel utilized and type of atmosphere used for activation. If there is a high temperature, the time to activate the silica gel is less whereas if the temperature is low, the time required for activation is longer. The time required for activation is normally from ½ to 25 hours. With the preferred activation temperatures, the time required for activation is normally from 2 to 5 hours.

Some silica gels are easily activated in an oxygen and hexafluoropropylene atmosphere while others are more readily activated in an atmosphere which also contains some hexafluoropropylene epoxide or which is substantially all hexafluoropropylene epoxide. The use of an atmosphere which contains some or all hexafluoropropylene epoxide is sometimes preceded or followed by the use of a mixture of hexafluoropropylene and oxygen. The oxygen can be in the form of air or other gas mixtures normally containing at least 20 percent by volume oxygen with the remainder being gas which is inert to the reaction such as helium or carbon dioxide. A gas which is substantially all oxygen is preferred.

The process of this invention can be batch or continuous, the latter being preferred. In a continuous operation the hexafluoropropylene and oxygen are passed over a bed of the silica gel which can be in afixed or fluidized form. In the fluidized bed, there is normally continual addition and removal of the silica gel to and from the bed. Thus, continued activation of new silica gel is taking place followed by the epoxidation of the hexafluoropropylene over the silica gel after such activation. Alternatively, the activation of the silica gel (step (a)) is carried out prior to the addition of the silica gel to the bed. The hydrochloric acid pretreatment step as well as the washing step and normally the drying step are carried out normally prior to the addition of the silica gel to the reactor. Alternatively, the drying step can be carried out after the addition of the silica gel to the reactor. This, of course, is only the case if the activation of step (a) is taking place in the reactor.

The molar ratio of the hexafluoropropylene to oxygen as fed to the reactor in which the expoxidation is to take place is normally from 1:5 to 15:1, preferably from 2:1 to 8:1 in both steps (a) and (b) of the process of this invention. The statements above relating to step (a) concerning the forms of the oxygen also apply to step (b).

In the process of the present invention, yields of up to about 80 percent and above can be obtained employing some of the silica gels. The conversions normally are about 10 to 40 percent. Conversion as used throughout is defined as the percentage amount of the hexafluoropropylene converted to compounds other than hexafluoropropylene specifically, to $COF_2$, $CO_2$, $CF_3COF$, and HFPO. The percentage yield of hexafluoropropylene epoxide is 100 times the moles of hexafluoropropylene converted to hexafluoropropylene epoxide divided by the moles of hexafluoropropylene consumed. The percentage yields of the other compounds are calculated similarly.

The pressure at which the process of this invention is operated depends on the temperature involved. Atmospheric pressure is normally utilized; superatmospheric pressure, normally not above about 3 atmospheres, can be utilized but these higher pressures are generally used when the lower temperatures are being maintained. Some silica gels produce lower conversions at the lower temperatures, and require higher temperatures or the use of pressure for the preferred yields and conversions. Superatmospheric pressure can be used in both step (a) and step (b), for instnce, when a continuous process is utilized, but can be limited to only step (b).

The process of this invention produces hexafluoropropylene epoxide in good yields and conversions for 10–80 hours. However, after this period, significant amounts of hexafluoroacetone are produced rather than the hexafluoropropylene epoxide. This can be prevented by having present from 0.5 to 3 mole percent water, based upon total reactants, i.e., hexafluoropropylene and oxygen. Addition of water increases silica gel life significantly. Normally, the addition of water is used in step (b) but it can also be used in step (a). If the technique of adding water is not utilized, the aged silica gel can be regenerated by passing steam over it followed by the hydrochloric acid treatment including the water wash step and by step (a) of the process of this invention.

The hexafluoropropylene epoxide can be separated from the outlet stream of the reactor in the process of this invention by scrubbing and extractive distillation.

Hexafluoropropylene epoxide is useful as an intermediate for preparing other intermediates such as perfluorovinyl ethers or high temperature resistant fluids. The ethers are useful in the preparation of ion exchange membranes, mechanical polymers, and elastomers.

The following examples are meant to illustrate but not to limit the invention. All percentages are molar unless otherwise specified. In the examples, HFP is hexafluoropropylene; HFPO is hexafluoropropylene epoxide; and PAF is perfluoroacetyl fluoride.

EXAMPLE I

A portion of Davison silica gel, Grade 45, (Davison Div., W. R. Grace Company, Baltimore, Md.) (10–20 mesh) was treated for about 5 hours with a one normal solution of hydrochloric acid followed by extensive washing with distilled water and drying. Seventy-one cc. of the pretreated silica gel were charged to a 6' long, 3/8" outside diameter stainless steel tube in the form of a coil which was then immersed in a silicone oil bath. The silica gel was heated to 240° C. for 2½ hours under a stream of 20 cc./min. hexafluoropropylene and 10 cc./min. of oxygen. The temperature of the oil bath was varied from the original temperature and exit stream from the reactor was analyzed using gas chromatography. Table 1 below summarizes the resulting data. The time at the beginning of the activation with hexafluoropropylene and oxygen was 10:35.

TABLE 1

| Time | Bed Temp., °C. | Flow rates Ml./min. HFP | $O_2$ | Conversion, percent HFP | Percent yield HFPO | $CO_2$ | $COF_2$ | PAF |
|---|---|---|---|---|---|---|---|---|
| 14:15 | 200 | 20 | 10 | 11 | 80 | 20 | | |
| 15:05 | 205 | 20 | 10 | 13 | 82 | 18 | | |
| 15:45 | 215 | 20 | 10 | 20 | 81 | 19 | | |
| 16:30 | 219 | 20 | 10 | 26 | 78 | 17 | | 5 |
| Heated overnight in the presence of helium (219° C.) | | | | | | | | |
| 10:15 | 217 | 20 | 10 | 38 | 6 | 8 | 21 | 65 |
| 13:30 | 223 | 20 | 10 | 37 | Trace | 10 | 24 | 66 |
| 14:00 | 223 | 15 | 15 | 70 | 5 | 7 | 24 | 61 |
| 14:45 | 223 | 10 | 20 | 76 | 0 | 10 | 29 | 60 |

EXAMPLE II

A portion of Davison silica gel, Grade 05, (10–20 mesh) was treated for 5 hours with a one normal solution of hydrochloric acid followed by extensive washing with distilled water and drying at 155° C. 63.7 grams of the pretreated silica gel were charged to a 6' long, 3/8" outside diameter stainless steel tubing in the form of a coil which was then immersed in a silicone oil bath. The silica gel was heated at 240° C. for 2½ hours under a stream of 20 cc./min. hexafluoropropylene and 10 cc./min. oxygen. The temperature of the oil bath was varied from the original temperature and the exit stream from the coil was analyzed by gas chromatography. Table 2 below summarizes the data from the run. The time at the beginning of the activation with hexafluoropropylene and oxygen was 10:45.

TABLE 2

| Time | Bed temp., °C. | Flow rates Ml./min. HFP | $O_2$ | Conversion, percent HFP | Percent yield HFPO | $CO_2$ | PAF |
|---|---|---|---|---|---|---|---|
| 14:35 | 201 | 20 | 10 | 0 | 0 | | |
| 16:00 | 206 | 20 | 10 | 0 | 0 | | |
| Heated overnight in the presence of helium | | | | | | | |
| 09:40 | 208 | 20 | 10 | 7 | 84 | 16 | |
| 10:55 | 214 | 20 | 10 | 13 | 81 | 19 | |
| 12:40 | 221 | 20 | 10 | 26 | 79 | 21 | |
| 13:35 | 229 | 20 | 10 | 46 | 65 | 30 | 4 |

I claim:
1. In a process for the epoxidation of hexafluoropropylene which comprises (a) activating silica gel by contacting it with a member selected from the class consisting of a mixture of oxygen and hexafluoropropylene, hexafluoropropylene epoxide and mixtures thereof at from 175 to 400° C. and (b) contacting the activated silica gel with hexafluoropropylene and oxygen at from 140 to 280° C., the improvement which comprises
(1) contacting the silica gel with hydrochloric acid, and
(2) thereafter water washing the silica gel prior to step (a).

2. The process of claim 1 in which the hydrochloric acid is from .1 to 5 normal.

3. The process of claim 2 which includes the additional step of drying the silica gel prior to carrying out step (a).

4. The process of claim 3 in which step (a) is carried out for ½ to 25 hours.

5. The process of claim 4 in which step (a) is carried out at from 200 to 280° C. and in which step (b) is carried out at from 190 to 225° C.

6. The process of claim 5 in which step (b) is carried out in the presence of water said water being present to the extent of 0.5 to 3 mole percent of the total moles of hexafluoropropylene and oxygen contacted with the activated silica gel.

7. The process of claim 1 in which step (b) is carried out in the presence of water said water being present to the extent of 0.5 to 3 mole percent of the total moles of hexafluoropropylene and oxygen contacted with the activated silica gel.

References Cited
UNITED STATES PATENTS 3,332,965  7/1967  Fukui et al. _____ 260—348.5 R
3,600,409  8/1971  Milian et al. _____ 260—348.5 R NORMA S. MILESTONE, Primary Examiner U.S. Cl. X.R.

260—348.5 F